(12) United States Patent
Borghi

(10) Patent No.: US 7,179,183 B2
(45) Date of Patent: Feb. 20, 2007

(54) PULLEY FOR A CONTINUOUSLY-VARIABLE-RATIO DRIVE

(75) Inventor: Gianni Borghi, Albinea (IT)

(73) Assignee: Lombardini S.R.L. A Socio Unico, Adelmo Lombardini (IT)

( * ) Notice: Subject to any disclaimer, the term of this patent is extended or adjusted under 35 U.S.C. 154(b) by 404 days.

(21) Appl. No.: 10/691,161

(22) Filed: Oct. 22, 2003

(65) Prior Publication Data

US 2004/0092345 A1    May 13, 2004

(30) Foreign Application Priority Data

Oct. 25, 2002    (IT)    ............................ TO2002A0930

(51) Int. Cl.
*F16H 9/18*      (2006.01)
*F16H 61/04*    (2006.01)

(52) U.S. Cl. .................................................... 474/19

(58) Field of Classification Search ............ 474/12–15, 474/19, 23, 37, 43–45
See application file for complete search history.

(56) References Cited

U.S. PATENT DOCUMENTS

| | | | | |
|---|---|---|---|---|
| 2,155,351 A | * | 4/1939 | Paulus | .......................... 474/19 |
| 2,951,388 A | * | 9/1960 | Tacquet | ........................ 474/19 |
| 3,605,510 A | * | 9/1971 | Laughlin | ....................... 474/14 |
| 4,173,155 A | * | 11/1979 | Togami et al. | ................. 474/19 |
| 6,413,178 B1 | | 7/2002 | Chamberland | |
| 6,733,406 B2 | * | 5/2004 | Kitai et al. | ...................... 474/19 |
| 2002/0065156 A1 | | 5/2002 | Younggren | |

FOREIGN PATENT DOCUMENTS

| | | | | |
|---|---|---|---|---|
| JP | (58-142060 A | * | 8/1983 | |
| JP | (170552 A | * | 9/1984 | ................... 474/13 |
| JP | (63-67453 A | * | 3/1988 | ................... 474/13 |
| JP | (05-60192 A | * | 3/1993 | ................... 474/19 |
| JP | (05-87202 A | * | 4/1993 | ................... 474/19 |
| JP | (11-257447) | * | 9/1999 | |
| JP | (2002-227949 A | * | 8/2002 | |

OTHER PUBLICATIONS

Patent Abstracts of Japan of JP 10-110797 of Apr. 1998.
Patent Abstracts of Japan of JP 58-142060 of Aug. 1983.
Patent Abstracts of Japan of JP 11-173392 of Jun. 1999.

* cited by examiner

*Primary Examiner*—Marcus Charles
(74) *Attorney, Agent, or Firm*—Ladas and Parry LLP

(57) ABSTRACT

A pulley for a continuously-variable-ratio drive, having a fixed half-pulley fitted to a shaft of the drive; a movable half-pulley mounted to slide axially with respect to the fixed half-pulley to define with it a V groove of variable size for a V belt; and a torque-sensitive, axial thrust compensating device having an acceleration cam and a deceleration cam, which are interposed between the fixed half-pulley and the movable half-pulley to generate thrust on the movable half-pulley in the compression direction of the belt in response to both a drive torque and a braking torque.

5 Claims, 3 Drawing Sheets

PULLEY FOR A CONTINUOUSLY-VARIABLE-RATIO DRIVE

FIELD OF THE INVENTION

The present invention relates to a pulley for a continuously-variable-ratio drive.

BACKGROUND OF THE INVENTION

Drives of the above type are known, which substantially comprise an input shaft; and a drive pulley connectable to the input shaft and comprising two half-pulleys defining a V groove of variable size to adjust the winding diameter of a V belt. One of the half-pulleys is movable axially with respect to the other by a mechanical centrifugal control device, or by an electronically controlled actuator, to vary the size of the groove.

Drives of the above type also comprise a driven pulley connected to the drive pulley by the V belt, and which is normally reactive, i.e. defined by two half-pulleys loaded axially towards each other by a spring to automatically adapt the work diameter in inverse manner to that of the drive pulley.

In one known solution, in addition to the spring, the two half-pulleys of the driven pulley are connected to each other by a torque-sensitive axial thrust compensating device for producing an additional axial load component when the drive accelerates. The compensating device is defined by a cam guide integral with one of the half-pulleys, and by a cam follower running inside the guide and integral with the other half-pulley; and the guide is defined by a slot sloping with respect to the axis of the half-pulleys so as to generate an axial load component on the cam follower in response to a drive torque acting on the pulley, and so increase the compression exerted by the half-pulleys on the sides of the belt.

High axial thrust at start-up can thus be achieved, while maintaining the load on the spring, and therefore the axial thrust generated by the spring in low-torque conditions, relatively low, thus improving the efficiency of the drive and reducing wear of the belt.

In the presence of a braking torque, however, known axial thrust compensating devices perform the opposite way, i.e. generate axial thrust in opposition to the load of the spring, thus impairing velocity ratio variation response when decelerating, and the belt is released improperly, thus reducing the efficiency with which the braking torque of the engine is transmitted when decelerating or braking.

SUMMARY OF THE INVENTION

It is an object of the present invention to provide a pulley for a continuously-variable-ratio drive, having an improved axial thrust compensating device for optimizing the axial thrust exerted by the half-pulleys on the sides of the belt in all operating conditions.

According to the present invention, there is provided a pulley as claimed in claim 1.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
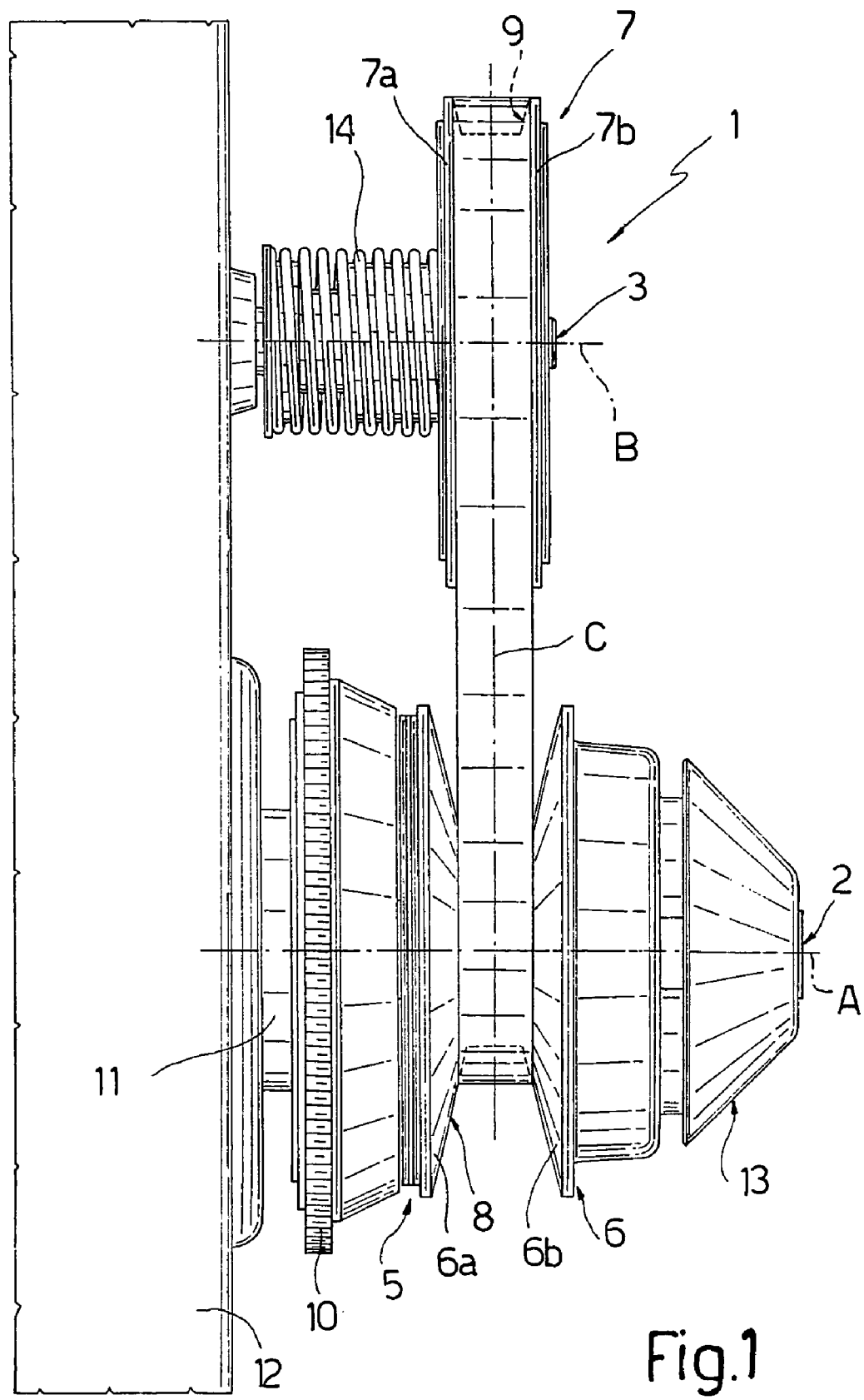
FIG. 1 shows a side view of a drive featuring a pulley in accordance with the present invention.

Number 1 in FIG. 1 indicates as a whole an automatic mechanically controlled variable-ratio drive for a vehicle, e.g. a scooter or microcar.

Drive 1 comprises an input shaft 2 of axis A; an output shaft 3 of axis B parallel to axis A; a drive assembly 5 fitted to input shaft 2 and having a drive pulley 6 connectable to input shaft 2 by a friction clutch not shown; and a driven pulley 7 fitted to output shaft 3.

Pulleys 6 and 7 are defined respectively by two half-pulleys 6a, 6b and 7a, 7b defining respective grooves 8 and 9 of variable size for a V belt C.

Input shaft 2 is connected rigidly to a flywheel 10 in turn fixed to a drive shaft 11 of an engine 12 (shown partly) of the vehicle.

A centrifugal control device 13—not illustrated by not forming part of the present invention—connects pulley 6 to input shaft 2, and varies the size of groove 8 as a function of the speed of input shaft 2.

Pulley 7 is a reactive type: half-pulleys 7a, 7b are loaded axially towards each other by a spring 14 in known manner, so as to automatically adapt the work diameter in the opposite way to that of pulley 6.

Figure 3:
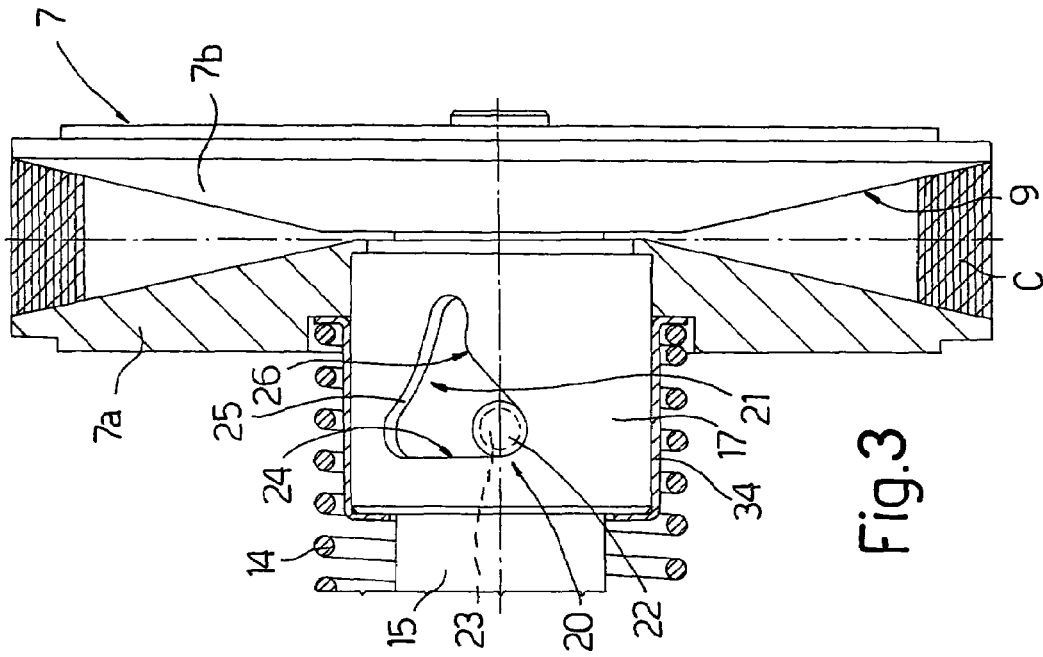
FIG. 3 shows an axial section of the pulley with parts removed for clarity.

More specifically, with reference to FIGS. 2 and 3, half-pulley 7b is integral with a tubular hub 15 fitted to output shaft 3 by a key 16, is fixed axially to shaft 3, is therefore connected rigidly to output shaft 3, and is therefore hereinafter referred to as the "fixed half-pulley".

Half-pulley 7a is connected rigidly to, e.g. driven onto, a tubular sleeve 17 fitted in sliding manner to hub 15, and is therefore hereinafter referred to as the "movable half-pulley".

Sleeve 17 and hub 15 are connected to each other by an axial thrust compensating device 20, which substantially comprises one or more slots 21 formed in sleeve 17, e.g. three slots 120° apart; and a corresponding number of cam followers defined by conveniently convex rollers 22 carried by pins 23 extending radially from hub 15 and engaging respective slots 21. Slots 21 (FIGS. 4 to 9) are substantially triangular, and are bounded axially by a substantially straight base side 24 facing the opposite way to fixed half-pulley 7b, and circumferentially by two curved sides 25, 26.

Base side 24 defines an axial stop for respective roller 22 when half-pulleys 7a, 7b are in the maximum-approach condition corresponding to the maximum work diameter of pulley 7 (engine idling).

Sides 25, 26, defining each slot 21 in the motion direction and opposite-to-motion direction respectively, are connected to base side 24 by respective bends 27, 28, and converge, on the opposite side to base side 24, to form a substantially axial portion 29 of slot 21, in turn terminating in a bend 30 defining an axial stop for respective roller 22 when half-pulleys 7a, 7b are in the maximum-parted condition corresponding to the minimum work diameter of pulley 7.

Each side 26 comprises a substantially 45° sloping portion 31 adjacent to base side 24; and an intermediate knee 32 connecting portion 31 to substantially axial portion 29 of the slot. Each side 25 has a more uniform profile, with a slope opposite to that of portion 31 of side 26 and decreasing gradually to define an inwardly-convex curve of slot 21.

Spring 14 is externally coaxial with hub 15 and sleeve 17, and is compressed axially between a stop plate 33 fixed to the end 19 of hub 15 opposite fixed half-pulley 7b, and movable half-pulley 7a or, more specifically, a cup-shaped member 34 fitted to sleeve 17 and cooperating axially with movable half-pulley 7a to protect slots 21 and keep out dirt or foreign bodies.

Pulley 7 operates as follows.

When the engine is idling, drive assembly 5 is idle on input shaft 2. When the speed of input shaft 2 increases and exceeds a predetermined threshold value, centrifugal control device 13 connects pulley 6 to input shaft 2 in conventional manner. Alongside variations in the speed of input shaft 2, control device 13 varies the size of groove 8 of pulley 6 in known manner, and, in particular, reduces it as speed increases, and increases it as speed decreases.

By means of spring 14 loading half-pulleys 7a, 7b towards each other, reactive pulley 7 adapts its work diameter in the opposite way to that of pulley 6.

Figure 2:
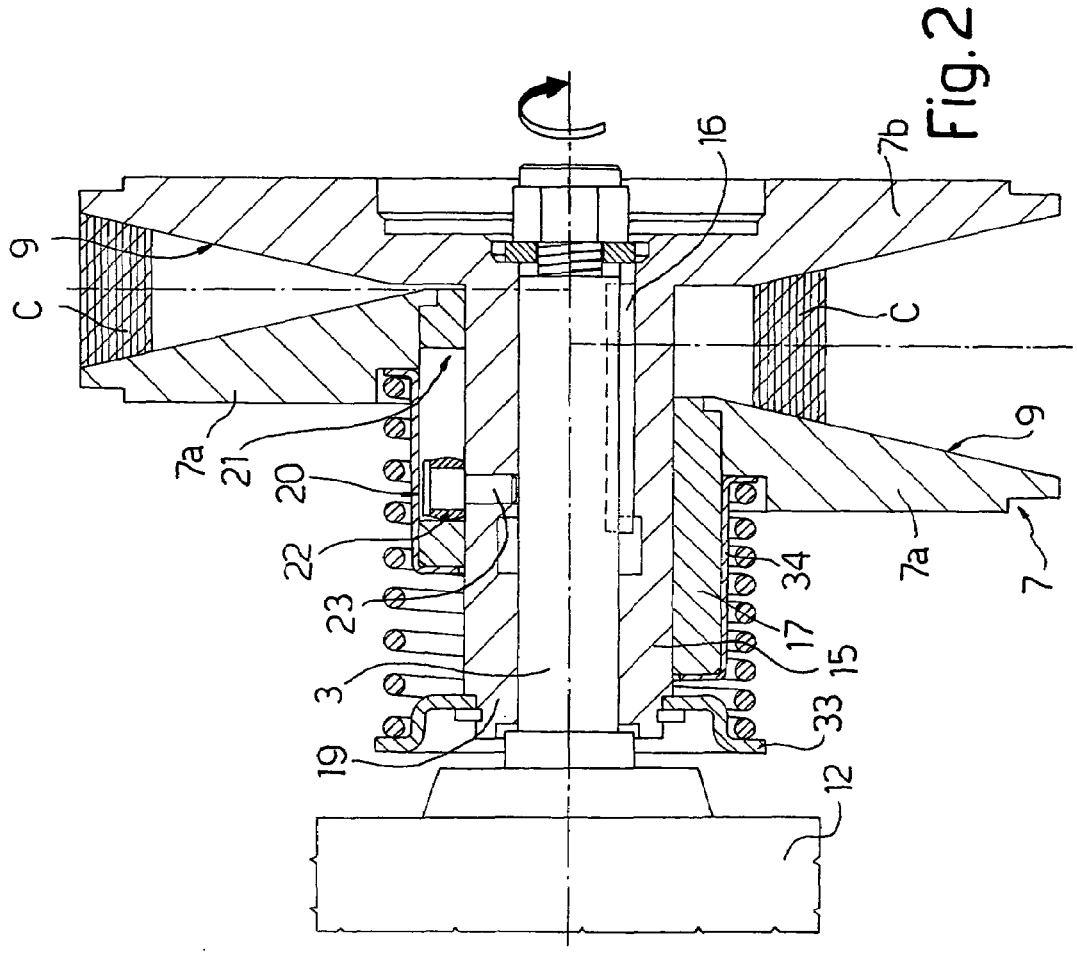
FIG. 2 shows an axial section of the pulley, the top and bottom halves of which show two operating conditions.

More specifically, when the work diameter of pulley 6 increases, the resulting increase in pull on belt C overcomes the action of spring 14 and moves movable half-pulley 7a away from fixed half-pulley 7b, as shown by the top and bottom halves of FIG. 2. Conversely, when the work diameter of pulley 6 decreases, the tension of the belt also decreases, and spring 14 moves movable half-pulley 7a towards fixed half-pulley 7b.

According to the present invention, to the elastic thrust of spring 14 is added the action of axial thrust compensating device 20, which exerts additional thrust, both when accelerating and decelerating, as explained below.

Sides 25 and 26 of each slot 21 define respective deceleration and acceleration cams by interacting with roller 22 when decelerating and accelerating.

When accelerating and decelerating, in fact, the drive torque and, respectively, the braking torque cause half-pulleys 7a and 7b to slip angularly with respect to each other. More specifically, in the presence of a drive torque, movable half-pulley 7a tends to "lead" fixed half-pulley 7b integral with output shaft 3 and therefore subject to the inertia of the driven masses; whereas, when decelerating, in which case the vehicle "governs" the engine, movable half-pulley 7a is braked by the engine and tends to "lag" with respect to the fixed half-pulley. Rollers 22 therefore cooperate with sides 26 defining respective slots 21 on the opposite side to the rotation direction when accelerating, and with sides 25 defining respective slots 21 on the rotation direction side when decelerating.

The effect of relative rotation between the half-pulleys depends on the degree of torque, so that, for a given profile of sides 25, 26, axial thrust compensating device 20 generates an axial thrust sensitive to, and in particular increasing with, torque.

FIGS. 4 to 9 show schematically the various operating conditions of device 20, which are shown and described with reference to one slot 21 and respective roller 22.

At idling speed, half-pulleys 7a, 7b are in the maximum-approach condition, so that roller 22 contacts base side 24 of slot 21.

In the presence of accelerating torque, roller 22, for the reasons given above, moves into contact with side 26 (FIG. 4) and is therefore positioned substantially at bend 28.

Figure 5:
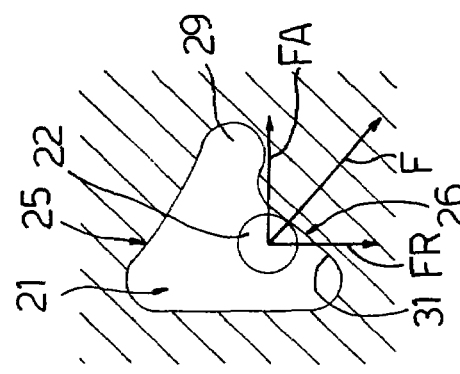
Figure 6:
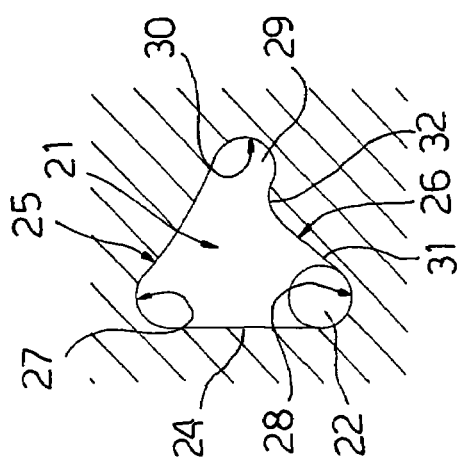
Figure 7:
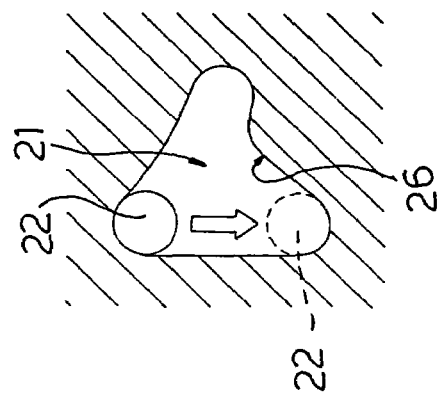
Figure 8:
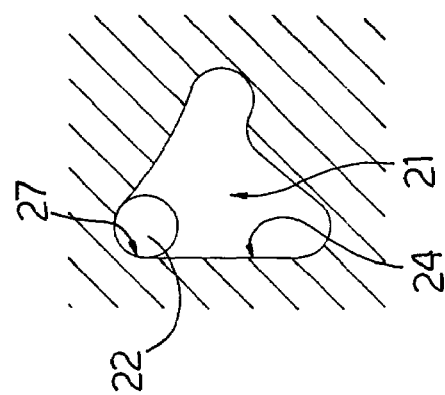
Figure 9:
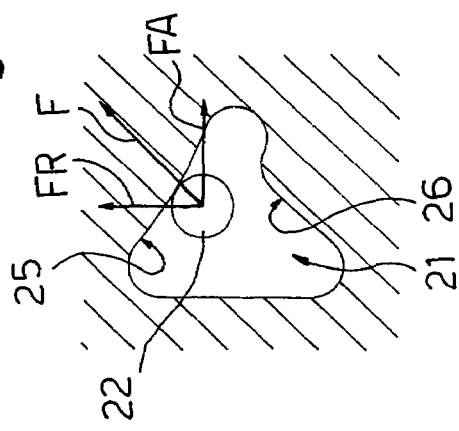

As the speed of input shaft 2 increases, half-pulleys 7a, 7b are parted axially by the pull on the belt, and in opposition to the combined thrust of spring 14 and device 20. In fact, as shown in FIG. 5, contact between roller 22 and sloping portion 31 of side 26 produces a resultant F dividable into a tangential component FR, and an axial component FA which assists in gripping movable half-pulley 7a axially to belt C, and so increasing the transmittable torque. It should be pointed out that component FA is high along portion 31 corresponding to the maximum-torque range of the engine, and is zeroed as roller 22 rolls over knee 32 into portion 29 of slot 21, i.e. in maximum-speed conditions (FIG. 6) in which less torque is transmitted and the action of spring 14 is therefore sufficient to prevent the belt slipping.

When decelerating, for the reasons given above, roller 22 contacts side 25 of the slot (FIG. 7), so that an axial component FA is still produced, and is added to the thrust of spring 14 to grip half-pulley 7a axially to belt C. At idling speed (FIG. 8), with the vehicle stationary, roller 22 is located at bend 27, contacting base side 24 of slot 21.

Figure 4:
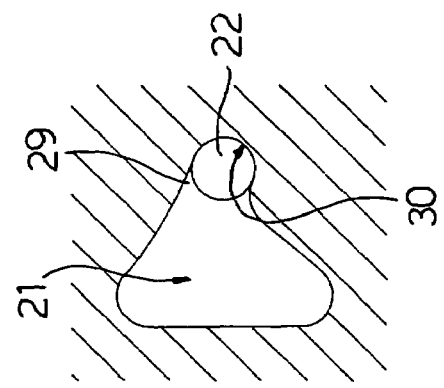
FIGS. 4 to 9 show diagrams illustrating different operating conditions of an axial thrust compensating device forming part of the FIG. 2 pulley.

At the next start-up (FIG. 9), the drive torque causes half-pulleys 7a, 7b to slip angularly with respect to each other, so that roller 22 moves over to side 26, i.e. into the same condition described with reference to FIG. 4.

The advantages of drive 1 according to the present invention will be clear from the foregoing description.

Firstly, axial thrust compensating device 20 also produces additional axial thrust on movable half-pulley 7a when decelerating, thus increasing the effectiveness of the braking torque of the engine when decelerating and braking.

Secondly, the part of the axial thrust generated by device 20 when accelerating is maximum at start-up, when the drive torque of the engine is maximum, thus increasing the efficiency of the drive at this stage.

Clearly, changes may be made to drive 1 as described herein without, however, departing from the scope of the accompanying claims.

In particular, axial thrust compensating device 20 may be used on drive pulley 6.

Changes may also be made to the number, arrangement, and form of slots 21 and cam followers 22.

The invention claimed is:

1. A continuously-variable-ratio-drive, comprising an input shaft; a drive pulley connectable to said input shaft; an output shaft; and a driven pulley connected to the output shaft; each of said pulleys being defined by a fixed-pulley and a movable half-pulley defining between them a groove of variable size for V belt; at least one of said pulleys (6, 7) comprising a torque-sensitive, axial thrust compensating device including at least one slot carried by one of said half-pulleys and at least one cam follower carried by the other of said half-pulleys and engaging said slot; said slot having a first side delimiting said slot in a first tangential direction so as to be contacted by said cam follower in response to a drive torque and to generate an axial thrust on said movable half-pulley in the belt compression direction in response to said drive torque, and a second side delimiting said slot in a second tangential direction so as to be contacted by said cam follower in response to a braking torque and to generate an axial thrust on said movable half-pulley in the belt compression direction in response to said braking torque; said first and second sides of said slot converging with one another to form an axial end portion of said slot that is engaged by said cam follower when said fixed and movable half-pulleys are in a maximum-parted position, said slot having a base side defining an axial stop for said cam follower in a maximum-approach position of said fixed and movable half-pulleys, said second side having a sloping profile extending from said base side to said axial end portion, said first side having an inclined portion adjacent to said base portion with a slope opposite to said second side and converging with respect to said second side towards said end portion of said slot, and an intermediate knee portion between said inclined portion and said axial end portion.

2. A device as claimed in claim 1, comprising a centrifugal control device acting on said drive pulley to vary the size of said groove of said drive pulley as a function of the speed of said input shaft; said half-pulleys of said drive pulley being loaded axially towards each other by a spring; and said compensating device acting on said half-pulleys of said driven pulley in the same direction as said spring.

3. A pulley for a continuously-variable-ratio drive, comprising a fixed half-pulley fixed to a shaft of said drive; a movable half-pulley mounted to slide axially with respect to said fixed half-pulley to define therewith a V groove of variable size; and a torque-sensitive, axial thrust compensating device including at least one slot carried by one of said half pulleys and at least one cam follower carried by the other said half-pulleys and engaging said slot; said slot having a first side delimiting said slot in a first tangential direction so as to be contacted by said cam follower in response to a drive torque and to generate an axial thrust on said movable half-pulley in a belt compression direction in response to said drive torque, and a second slide delimiting said slot in a second tangential direction so as to be contacted by said cam follower in response to a braking torque and to generate an axial thrust on said movable half-pulley in the belt compression direction in response to said braking torque; said first and second sides of said slot converging with one another to form an axial end portion of said slot that is engaged by said cam follower when said fixed and movable half-pulleys are in a maximum-parted position, said slot having a base side defining an axial stop for said cam follower in a maximum-approach position of said fixed and movable half-pulleys, said second side having a sloping profile extending from said base side to said axial end portion, said first side having an inclined portion adjacent to said base portion with a slope opposite said second side and converging with respect to said second side towards said end portion of said slot, and an intermediate knee portion between said inclined portion and said axial end portion.

4. A pulley as claimed in claim 3, wherein said cam follower is carried by a hub of said fixed half-pulley; and said slot is formed in a sleeve integral with said movable half-pulley and coaxial with, and sliding on, said hub of said fixed half-pulley.

5. A pulley as claimed in claim 3, wherein said second side has inwardly convex profile with a gradually decreasing slope from said base side to said axial end portion of said slot.

* * * * *